(12) United States Patent
Komoda et al.

(10) Patent No.: US 6,784,621 B2
(45) Date of Patent: Aug. 31, 2004

(54) FIELD EMISSION-TYPE ELECTRON SOURCE AND METHOD OF BIASING THE SAME

(75) Inventors: Takuya Komoda, Sanda (JP); Tsutomu Ichihara, Hirakata (JP); Koichi Aizawa, Neyagawa (JP); Yoshiaki Honda, Kyoto (JP); Yoshifumi Watabe, Tondabayashi (JP); Takashi Hatai, Neyagawa (JP); Yoshiyuki Takegawa, Nara (JP); Toru Baba, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/281,358

(22) Filed: Oct. 28, 2002

(65) Prior Publication Data

US 2003/0090211 A1 May 15, 2003

(30) Foreign Application Priority Data

Oct. 29, 2001 (JP) ........................................ 2001-331470

(51) Int. Cl.$^7$ ................................................ H01J 1/30
(52) U.S. Cl. .................................. 315/169.1; 315/169.3
(58) Field of Search ........................... 315/169.3, 169.4, 315/169.1

(56) References Cited

U.S. PATENT DOCUMENTS

| | | | | |
|---|---|---|---|---|
| 5,136,212 A | * | 8/1992 | Eguchi et al. | ............... 315/150 |
| 6,249,080 B1 | | 6/2001 | Komoda et al. | |
| 6,285,118 B1 | | 9/2001 | Hatai et al. | |
| 6,498,426 B1 | | 12/2002 | Watabe et al. | |
| 6,583,578 B1 | | 6/2003 | Ichihara et al. | |
| 6,590,321 B1 | | 7/2003 | Komoda et al. | |

FOREIGN PATENT DOCUMENTS

| | | |
|---|---|---|
| JP | 7-226146 | 8/1995 |
| JP | 9-55162 | 2/1997 |
| JP | 10-27539 | 1/1998 |
| JP | 11-95716 | 4/1999 |
| JP | 2987140 | 10/1999 |
| JP | 11329213 | 11/1999 |
| TW | 436837 | 5/2001 |

OTHER PUBLICATIONS

English Language Abstract of JP 7–226146.
English Language Abstract of JP 11–95716.
English Language Abstract of JP 11–329213.
English Language Abstract of JP 9–55162.

* cited by examiner

*Primary Examiner*—David Vu
(74) *Attorney, Agent, or Firm*—Greenblum & Bernstein, P.L.C.

(57) ABSTRACT

An electron source (10) has an electron source element (10a) including a lower electrode (12), a drift layer (6) and a surface electrode (7). The drift layer (6) is interposed between the lower electrode (12) and the surface electrode (7). When a certain voltage is applied between the surface electrode (7) and the lower electrode (12) such that the surface electrode (7) has a higher potential than that of the lower electrode (12), a resultingly induced electric field allows electrons to pass through the drift layer (6) and then the electrons are emitted through the surface electrode (7). When a forward-bias voltage is applied between the surface electrode (7) and the lower electrode (12), a reverse-bias voltage is applied after the forward-bias voltage has been applied to release out of the drift layer (6) an electron captured by a trap (9) in the drift layer (6).

22 Claims, 11 Drawing Sheets

FIELD EMISSION-TYPE ELECTRON SOURCE AND METHOD OF BIASING THE SAME

CROSS REFERENCE TO RELATED APPLICATIONS

This application is based upon and claims the benefit of priority from Japanese Patent Application No. 2001-331470, the content of which is incorporated herein by reference in its entirety.

BACKGROUND OF THE INVENTION

1. Field of the Invention

The present invention relates to a field emission-type electron source including an electron source element for emitting electron beams by means of the field emission phenomenon and a method of biasing such a field emission-type electron source.

2. Description of the Prior Art

Heretofore, there has been known a field emission-type electron source (hereinafter referred to as "electron source") including a lower electrode, a surface electrode (upper electrode) composed of a metal thin-film opposed to the lower electrode, and an electron transit layer interposed between the lower and surface electrodes. In this kind of electron source, when a certain voltage is applied between the lower and surface electrodes such that the surface electrode has a higher potential than that of the lower electrode, a resulting electric field between the electrodes induces the flow of electrons from the lower electrode to the surface electrode through the electron transit layer. After passing through the electron transit layer, the electrons are emitted through the surface electrode.

A conventional electron transit layer for use in this kind of electron source includes a strong-field drift layer (hereinafter referred to as "drift layer") composed of an oxidized or nitrided porous polycrystalline silicon layer (see Japanese Patent Publication No. 2987140, as an example). There have also been known an electron source using an oxidized or nitrided monocrystalline silicon layer as the electron transit layer, and a MIM (Metal-Insulator-Metal) type electron source using an insulator layer as the electron transit layer (see Japanese Patent Laid-Open Publication No. 7-226146, as an example).

FIG. 15 shows one example of conventional electron sources having a drift layer. Referring to FIG. 15, an electron source 10 includes a drift layer 6 which is composed of an oxidized porous polycrystalline silicon layer (polycrystalline silicon layer transformed into a porous structure) and formed on a front surface of an n-type silicon substrate 1 as a conductive substrate through a non-doped polycrystalline silicon layer 3. A surface electrode 7 composed of a metal thin-film (e.g. gold film) is formed on the drift layer 6. An ohmic electrode 2 is formed on a back surface of the n-type silicon substrate 1. The n-type silicon substrate 1 and the ohmic electrode 2 make up a lower electrode 12. There has also been proposed an alternative electron source having the drift layer 6 formed directly on the front surface of the n-type silicon substrate 1 without interposing the polycrystalline silicon layer 3 between the n-type silicon substrate 1 and the drift layer 6.

While the lower electrode 12 of the electron source 10 in FIG. 15 is made up of the n-type silicon substrate 1 and the ohmic electrode 2, an alternative electron source 10 has been proposed in which a lower electrode 12 of a metal material is formed on a front surface of an insulative substrate 11 composed, for example, of a glass substrate, as shown in FIG. 16.

The electron source 10 in FIG. 15 or 16 is operable to emit electrons through the following process. A collector electrode 21 is first positioned opposed to the surface electrode 7. Then, a DC voltage Vps is applied between the surface electrode 7 and the lower electrode 12 such that the surface electrode 7 has a higher potential than that of the lower electrode 12, while forming a vacuum space between the surface electrode 7 and the collector electrode 21. Additionally, a DC voltage Vc is applied between the collector electrode 21 and the surface electrode 7 such that the collector electrode 21 has a higher potential than that of the surface electrode 7. By appropriately setting the respective DC voltages Vps, Vc, electrons injected from the lower electrode 12 are drifted across the drift layer 6, and then emitted through the surface electrode 7. The one-dot chain lines in FIG. 15 or 16 indicate the flow of the electrons $e^-$ emitted through the surface electrode 7. The electrons reaching a front surface of the drift layer 6 can be considered as hot electrons. Thus, such electrons readily tunnel through the surface electrode 7 and emitted into the vacuum space.

Terms "diode current Ips" and "emission current (emission electron current) Ie" as used in the electron sources 10 generally mean a current flowing between the surface electrode 7 and the lower electrode 12 and a current flowing between the collector electrode 21 and the surface electrode 7, respectively. In the electron sources 10, a greater ratio of the emission current Ie to the diode current (Ie/Ips) provides higher electrode emitting efficiency. The above electron sources 10 is operable to emit electrons even if the DC voltage Vps to be applied between the surface electrode 7 and the lower electrode 12 is set in a low range of about 10 to 20 V, and the emission current Ie is increased as the DC voltage Vps is increased.

For example, the electron source 10 as shown in FIG. 15 or 16 is applicable to an electron source for displays (see FIG. 12).

In the conventional electron sources 10, the drift layer 6 includes traps acting to capture electrons. Thus, some of electrons injected from the lower electrode 12 into the drift layer 6 are captured by the traps, which will reduce the diode current Ips and the emission current Ie with time, resulting in relatively short lifetime of the electron sources.

In this context, there has been proposed an electron-source biasing method in which an electric field having a polarity to be alternately inversed is applied between a lower electrode and a surface electrode to allow captured electrons in traps to be released and emitted (see the Japanese Patent Laid-Open Publication No. 7-226146, as an example). This electron source is a MIM type electron source including an upper electrode (the surface electrode) made of metal or highly-doped semiconductor, the lower electrode made of metal or highly-doped semiconductor, and an insulator layer interposed between the upper and lower electrodes. This electron source is operable to alternately inverse the polarity of a voltage to be applied between the upper and lower electrodes, so that some of electrons to be captured by a first trap formed in the insulator layer adjacent to the upper electrode and a second trap formed in the insulator layer adjacent to the lower electrode are moved between the first and second traps to facilitate effective emission of the electrons.

However, assuming that the biasing method disclosed in the Japanese Patent Laid-Open Publication No. 7-226146 is applied to the electron source 10 as shown in FIG. 15 or 16, even if an electron captured by a trap in the drift layer 6 is released from the trap, the released electron will be captured by another trap in the drift layer 6. Thus, the diode current Ips and the emission current Ie will be undesirably reduced with time, and thereby adequate lifetime cannot be obtained.

Japanese Patent Laid-Open Publication No. 11-95716 discloses an electron source biasing method used in an image display device having the electron source elements in a matrix arrangement, in which after a scanning operation in each frame period, a reverse voltage is applied simultaneously to all of the electron source elements to allow captured electrons in traps to be released and emitted. This biasing method has the following problems.

(1) Regardless of whether a voltage has been applied to bias (or actuate) each of the electron source elements, the reverse bias voltage is applied simultaneously to all of the electron source elements in each frame period. Thus, a significant fluctuation will occur in respective electron emission characteristics of the electron source elements. This fluctuation cannot be controlled because the bias condition of each of the electron source elements is dependent on an image to be displayed thereby.

(2) The reverse bias voltage is applied simultaneously to one electron source element which has been biased in the initial stage of one frame period and another electron source element which has been biased in the later stage of the frame period. Thus, these electron source elements will have a difference in a waiting time between the completion of the bias and the initiation of the application of the reverse bias voltage, and consequently a significant fluctuation will occur in respective electron emission characteristics of the electron source elements. This fluctuation is increased as the use period of the electron source elements gets longer because the scanning sequence of the electron source elements is fixed.

SUMMARY OF THE INVENTION

In view of the above problems of the conventional electron sources, it is therefore an object of the present invention to provide an electron-source biasing method capable of providing a longer lifetime of an electron source.

It is another object of the present invention to provide an electron source having a longer lifetime.

In order to achieve the above objects, the present invention provides a method of biasing an electron source (field emission-type electron source). The electron source used in this biasing method includes an electron source element having a lower electrode, a surface electrode, and a drift layer (strong-field drift layer) interposed between the lower and surface electrodes. When a forward voltage is applied between the lower and surface electrodes such that the surface electrode has a higher potential than that of the lower electrode, a resultingly induced electric field allows electrons to pass through the drift layer. The electrons passing through the drift layer is emitted through the surface electrode. The electron source biasing method includes the steps of applying a reverse voltage (negative voltage, reverse bias voltage) the electron source element after the forward voltage (positive voltage, forward-bias voltage) has been applied to the electron source element, and applying no reverse voltage to the electron source element after the forward voltage has not been applied to the electron source element.

According to the above electron source biasing method, the reverse voltage is applied to the electron source element only if the forward voltage has been applied to the electron source element. This makes it possible to suppress the fluctuation of electron emission characteristics caused by different bias conditions of the electron source element. This effect can be enhanced by controlling the reverse voltage in response to the absolute value of the forward voltage. The effect of applying the reverse-bias voltage can be constant by setting the time-period of applying the forward and reverse voltages at a given or constant value, which allows the fluctuation of electron emission characteristics to be more effectively suppressed. Further, it can be avoided to apply unnecessary voltage to the electron source element because no reverse voltage is applied when no forward voltage has been applied. This provides enhanced reliability of the electron source element. In a device having a matrix arrangement such as displays, electrons can be emitted from an electron-emitting surface with enhanced uniformity.

The present invention provides another method of biasing a field emission-type electron source including a plurality of electron source elements. A drift layer in each of the electron source elements includes a number of nano-order semiconductor nanocrystals, and an insulating film formed on the surface of each of the semiconductor nanocrystals. The insulating film has a film thickness less than the grain size of each of the semiconductor nanocrystals. In this electron source biasing method, a reverse voltage is applied simultaneously to all of the electron source elements in each frame period.

The present invention further provides another electron source including an electron source element and a bias circuit. The electron source element includes a lower electrode, a surface electrode, and a drift layer interposed between the lower and surface electrodes. When a forward voltage is applied between the lower and surface electrodes such that the surface electrode has a higher potential than that of the lower electrode, a resultingly induced electric field allows electrons to pass through the drift layer. The electrons passing through the drift layer are emitted through the surface electrode. The bias circuit includes a forward voltage applying circuit and a reverse voltage applying circuit. The bias circuit is operable to apply a reverse voltage to the electron source element through the reverse voltage applying circuit after a forward voltage has been applied to the electron source element through the forward voltage applying circuit, and to apply no reverse voltage to the electron source element through the reverse voltage applying circuit after the forward voltage has not been applied to the electron source element through the forward voltage applying circuit.

In this manner, the present invention provides extended lifetime of the electron source.

BRIEF DESCRIPTION OF THE DRAWINGS

A more complete understanding of the invention will be apparent from the following detailed description when taken in conjunction with the accompanied drawings in which same elements or components have the same reference numerals, wherein.

DETAILED DESCRIPTION OF THE PREFERRED EMBODIMENTS

Specific embodiments of the present invention will now be described with reference to the drawings.
(First Embodiment)

Figure 1:
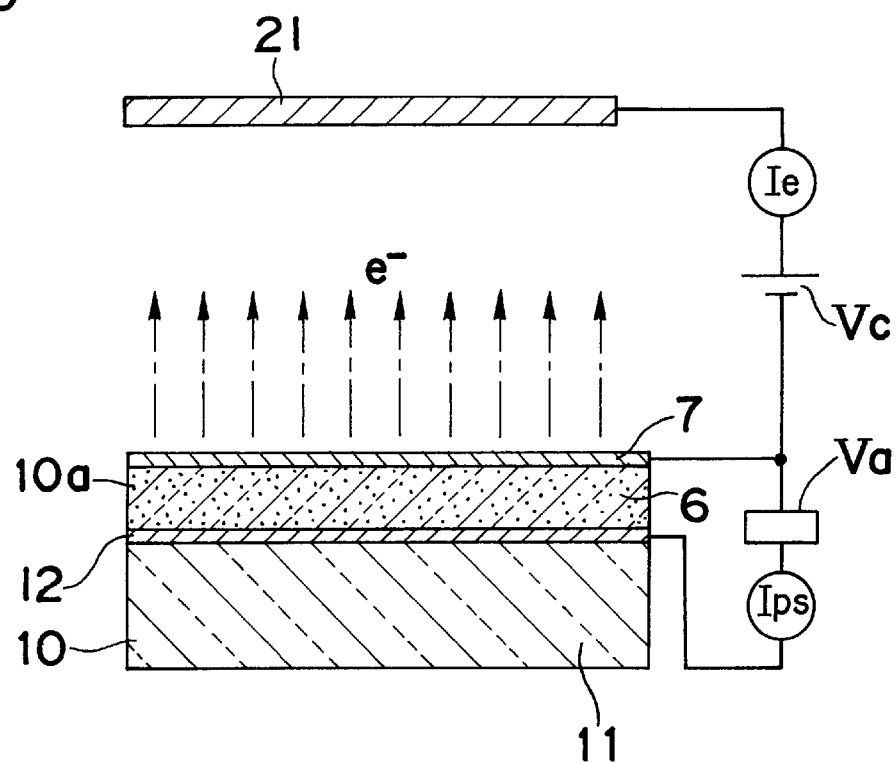
FIG. 1 is an elevational sectional view of an electron source according to a first embodiment of the present invention.
Figure 2:
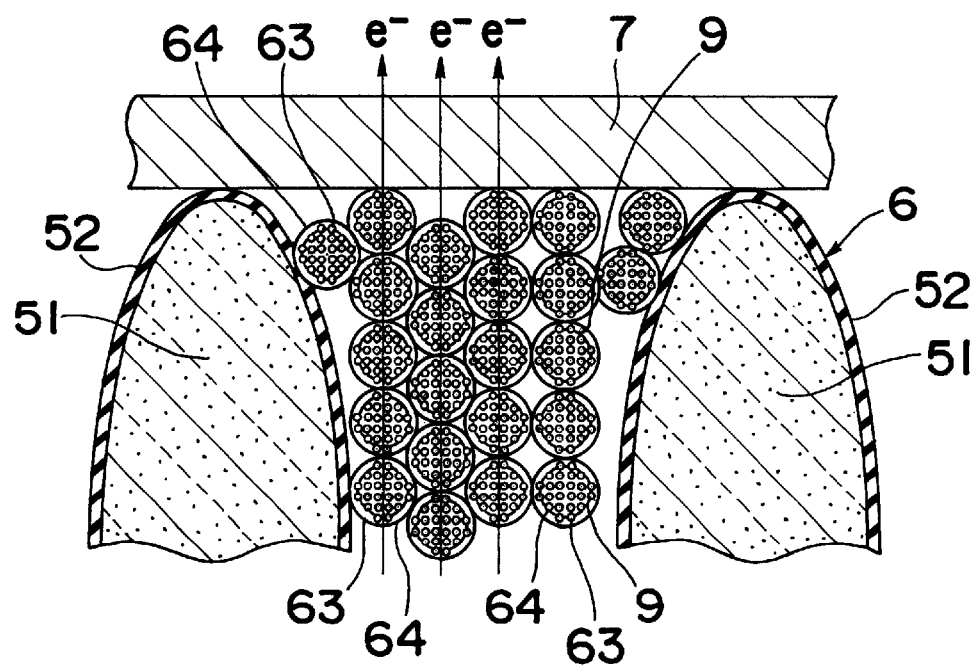
FIG. 2 is an enlarged elevational sectional view of a drift layer and a surface electrode of the electron source in FIG. 1.

With reference to FIGS. 1 and 2, an electron source (field emission-type electron source) 10 according to a first embodiment of the present invention will first be described, and subsequently a method of biasing the electron source 10 will be described.

Figure 16:
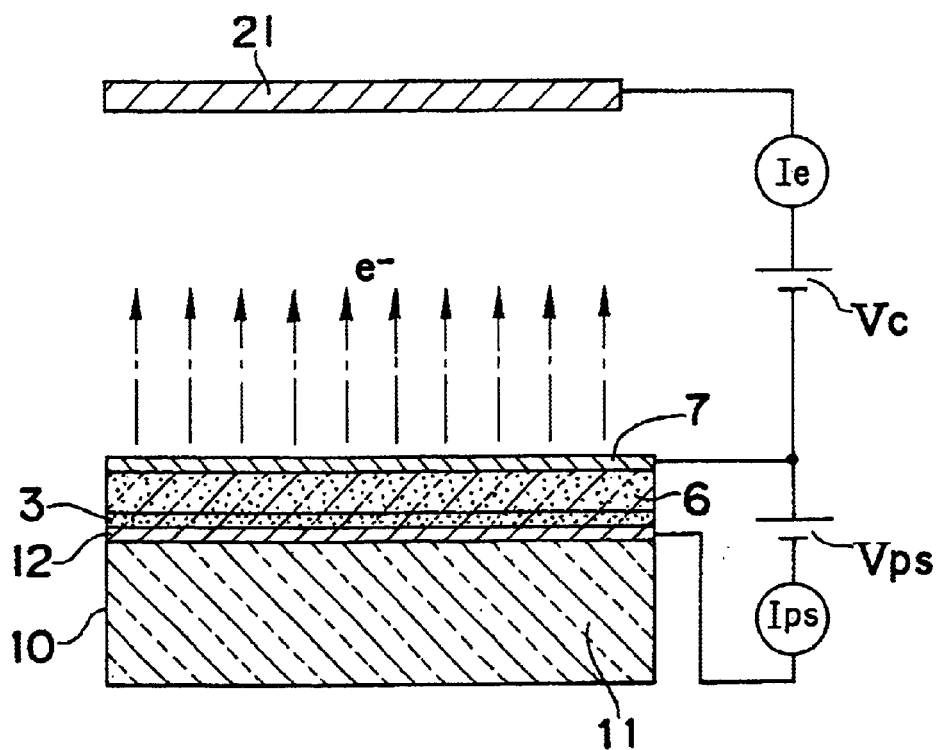
FIG. 16 is an elevational sectional view of another conventional electron source.

As shown in FIG. 1, the electron source 10 includes an insulative substrate 11 (e.g. glass substrate or ceramic substrate), and a lower electrode 12 made of a conductive material (e.g. metal or highly-doped polycrystalline silicon) and formed on a front surface or one of the principal surfaces of the insulative substrate 11. A drift layer 6 (strong-field drift layer) composed of an oxidized porous polycrystalline silicon layer is formed on the lower electrode 12. A surface electrode 7 composed of a metal thin-film (e.g. gold thin-film) is formed on the drift layer 6. The thickness of the surface electrode 7 is set in the range of about 10 to 15 nm. The electron source 10 according to the first embodiment does not include the polycrystalline silicon layer 3 of the conventional electron source in FIG. 16. In the first embodiment, an electron source element 10a is made up of the lower electrode 12, the drift layer 6 and the surface electrode 7.

As shown in FIG. 2, the drift layer 6 includes a plurality of columnar polycrystalline silicon grains (semiconductor crystals) 51 arrayed along a surface of the lower electrode 12 on the side of the front surface 7, a thin silicon oxide film 52 formed on the surface of each of the grains 51, a number of nano-order silicon nanocrystals (semiconductor nanocrystals) 63 interposed between the adjacent grains 51, and a number of silicon oxide films 64 formed on the respective surfaces of the silicon nanocrystals 63. The silicon oxide film 64 is an insulating film having a film thickness less than the crystal grain size of the silicon nanocrystal 63. That is, in the drift layer 6, each surface of the grains or polycrystalline silicone layers is transformed into a porous structure, and each central region of the grains has a maintained crystalline state. Each of the grains 51 extends in the thickness direction of the lower electrode 12. The drift layer 6 may be formed by forming a non-doped polycrystalline silicon layer on the lower electrode 12, transforming the polycrystalline silicon layer into a porous structure through an anodizing treatment, and oxidizing the porous polycrystalline silicon layer, for example, at 900° C. through a rapid thermal oxidization method.

The electron source 10 can emit electrons therefrom according to the following process. A collector electrode 21 is first positioned opposed to the surface electrode 7. Then, a bias power supply Va applies a bias voltage between the surface electrode 7 and the lower electrode 12 such that the surface electrode 7 has a higher potential than that of the lower electrode 12, while forming a vacuum space between the surface electrode 7 and the collector electrode 21. Further, a DC voltage Vc is applied between the collector electrode 21 and the surface electrode 7 such that the collector electrode 21 has a higher potential than that of the surface electrode 7. By appropriately setting the bias voltage and the DC voltage Vc, electrons injected from the lower electrode 12 are drifted across the drift layer 6 and then emitted through the surface electrode 7. The one-dot chain lines in FIG. 1 indicate the flow of the electrons e⁻ emitted through the surface electrode 7.

In principle, the electron source 10 would emit electrons based on the following model.

The bias power supply Va applies a voltage between the surface electrode 7 and the lower electrode 12 such that the surface electrode 7 has a higher potential than that of the lower electrode 12, and simultaneously a DC voltage Vc is applied between the collector electrode 21 and the surface electrode 7 such that the collector electrode 21 has a higher potential than that of the surface electrode 7. When the voltage applied between the surface electrode 7 and the lower electrode 12 reaches a given value (critical value), electrons e⁻ which are thermally excited from the lower electrode 12 into the drift layer 6, start to drift toward the surface electrode 7 side. At the same time, the electric field applied to the drift layer 6 mostly acts to the silicon oxide films 64. Thus, the injected electrons e⁻ are accelerated by the strong electric field acting to the silicon oxide films 64. Then, the electrons e⁻ are drifted toward the surface electrode or in the direction of the arrows in FIG. 2 through the region between the adjacent grains 51 in the drift layer 6. After tunneling through the surface electrode 7, the electrons are emitted from the surface electrode 7 to the vacuum space. As above, the electrons injected from the lower electrode 12 are acceleratingly drifted across the drift layer 6 by the electric field acting to silicon oxide films 64 approximately without scattering due to the silicon microcrystals 63 and then emitted through the surface electrode 7 (ballistic electron emission phenomenon). Further, heat generated at the drift layer 6 can be released through the grains 51. Thus, during the electron emission, the electrons can be stably emitted without occurrence of the popping phenomenon. Since the electrons reaching the front surface of the drift layer 6 can be considered as hot electrons, they are emitted into the vacuum space after readily tunneling through the surface electrode 7.

In the first embodiment, the drift layer 6 is composed of the oxidized porous polycrystalline silicon layer. Alternatively, the drift 6 may be composed of a nitrided porous polycrystalline silicon layer or an oxynitrided porous polycrystalline silicon layer. Further, the drift layer 6 may be composed of any other suitable oxidized, nitrided or oxynitrided porous semiconductor layer. When the drift layer 6 is composed of the nitrided porous polycrystalline silicon layer, silicon nitride films are formed as a substitute for the silicon oxide films 52, 64. When the drift layer 6 is composed of the oxynitrided porous polycrystalline silicon layer, silicon oxynitride films are formed as a substitute for the silicon oxide films 52, 64.

The method of biasing the electron source 10 will be described below. Initially, the outline of the method of biasing the single electron source element 10a constituting the electron source 10 will be described.

The electron source element 10a is biased (or actuated) by the bias power source Va adapted to apply a voltage between the surface electrode 7 and the lower electrode 12. When the bias power supply Va provides a forward-bias voltage for achieving the state where the surface electrode 7 has a higher potential than that of the lower electrode 12 (hereinafter referred to as "forward-bias voltage"), the forward-bias voltage is applied between the surface electrode 7 and the lower electrode 12. A resultingly induced electric field allows electrons e⁻ to be drifted across the drift layer 6 and emitted through the surface electrode 7.

As shown in FIG. 2, the drift layer 6 includes the number of silicon microcrystals 63, and the silicone oxide layers 64 formed on the respective surfaces of the silicon nanocrystals 63, and each of the silicone oxide layers 64 is formed with a trap 9 (e.g. defect, impurity or dangling bond). When the biase power supply Va applies the forward-bias voltage for achieving the state where the surface electrode 7 has a higher potential than that the lower electrode 12 (for example, when the surface electrode 7 has a potential of 20V and the lower electrode 12 has a potential of 0V, the forward-bias voltage will be 20V), some of electrons injected from the lower electrode 12 into the drift layer 6 are captured by the traps 9. However, in the method of biasing the electron source element 10a according to the first embodiment, a reverse-bias voltage (reverse voltage) is applied between the surface electrode 7 and the lower electrode 12 during a time-period when the bias power supply Va apples no forward-bias voltage between the surface electrode 7 and the lower electrode 12, to allow the captured electrons in the traps 9 to be released out of the drift layer 6. Thus, the electrons captured by the traps 9 in the drift layer 6 is moved to the lower electrode 12 during the time-period when the bias power supply Va apples no forward-bias voltage between the surface electrode 7 and the lower electrode 12. That is, the bias power supply Va includes means for allowing the electrons captured by the traps 9 in the drift layer 6 serving as an electron transit layer to be released out of the drift layer 6.

Figure 3:
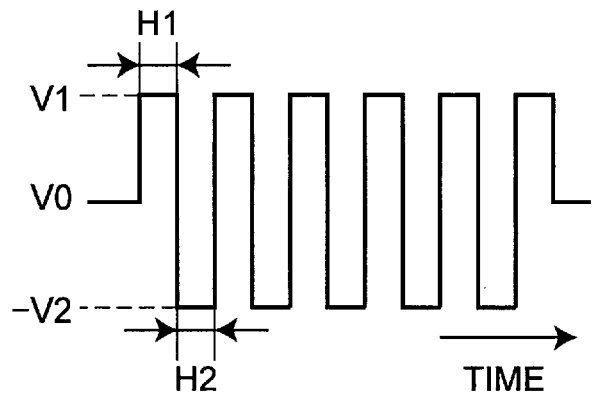
FIG. 3 is a waveform chart of an output voltage of a bias power supply.

For example, when an output voltage of the bias power supply is formed of a pulse voltage as shown in FIG. 3, and a forward-bias voltage V1 (e.g. +20V) having a pulse width H1 and a reverse-bias voltage −V2 (e.g. −10V) having a pulse width H2 are applied between the surface electrode 7 and the lower electrode 12, the electrons captured by the traps 9 during the application of the forward-bias voltage V1 are released from the traps 9 out of the drift layer 6. In FIG. 3, a reference voltage V0 is set at 0 V.

Figure 4:
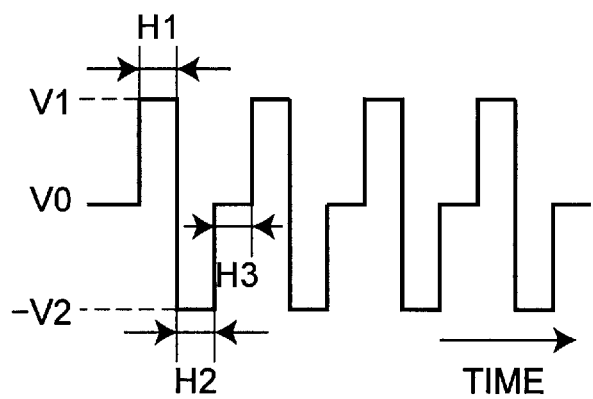
FIG. 4 is another waveform chart of an output voltage of the bias power supply.

The output voltage of the bias power supply Va in FIG. 3 has a waveform in which the forward-bias voltage V1 and the reverse-bias voltage −V2 are alternately repeated. Alternatively, as shown in FIG. 4, the waveform may be provided with an off voltage time-period H3 for generating the reference voltage (=0V) after the forward-bias voltage V1 and the reverse-bias voltage −V2 are generated in turn, so as to vary the output voltage at three voltage levels V1, V2 and V0. This case can provide reduced power consumption.

In the method of biasing the electron source 10 according to the first embodiment, the electrons captured by the traps 9 in the drift layer 6 when the forward-bias voltage is applied between the surface electrode 7 and the lower electrode 12 are released out of the drift layer 6 according to the energy from the bias power supply Va. This makes it possible to suppress the relaxation of the electric field due to the electrons captured by the traps 9 in the drift layer 6 and to provide extended lifetime of the electron source 10. Further, the reverse-bias voltage from the bias power supply Va is applied in the form of a pulsed voltage between the surface electrode 7 and the lower electrode 12. This facilitates controlling the timing of moving the electrons captured by the traps 9 in the drift layer 6 to the lower electrode 12.

A more specific method of biasing an electron source 10 having a plurality of electron source elements 10a will be described below.

Figure 5:
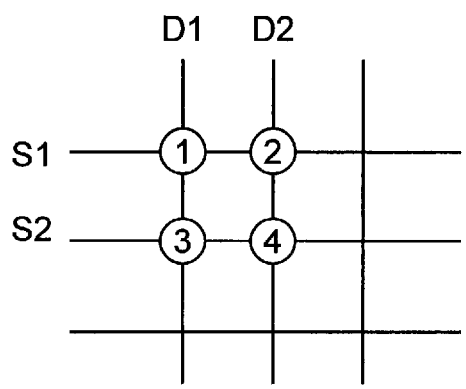
FIG. 5 is a schematic diagram showing a wiring configuration of row selection lines and column selection lines to electron source elements.

As shown in FIG. 5, the electron source 10 includes four electron source elements ① to ④ each having the structure as shown in FIGS. 1 and 2, two column selection lines D1, D2, and two row selection lines S1, S2. The column selection lines D1, D2 are connected to the surface electrodes 7 of the corresponding electron source elements ① to ④, and the raw selection lines S1, S2 are connected to the lower electrodes 12 of the corresponding electron source elements ① to ④. Thus, each of the electron source elements ① to ④ is applied with a differential voltage between the column selection lines D1, D2 and the row selection lines S1, S2. In FIG. 6B, when a positive voltage is applied to each of the electron source elements ① to ④, the surface electrode 7 has a higher potential or voltage than that of the lower electrode 12.

In FIG. 6B, given that during the time-period between the time t0 and the time t1, the column selection line D1 and the row selection line S1 are selected, and consequently the electron source element ① is biased (selected). In this case, the bias circuit Va applies a voltage or potential, for example, having a pattern as shown in FIG. 6, to the column selection lines D1, D2 and the row selection lines S1, S2. Thus, the forward-bias voltages and the reverse-bias voltages as shown in FIG. 6B are applied between the surface electrode 7 and the lower electrode 12 in each of the electron source elements ① to ④.

Figure 6A:
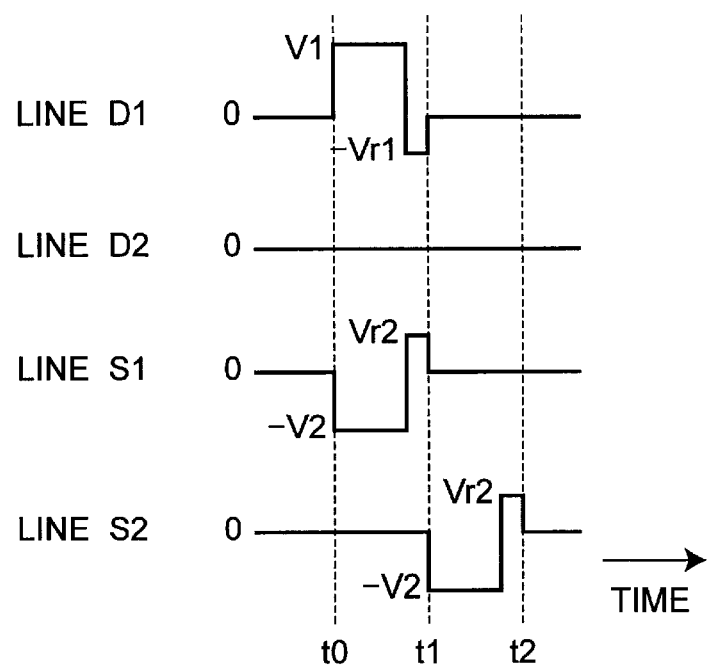
FIGS. 6A to 6B are diagrams showing a voltage pattern to be applied to the row and column selection lines and a voltage pattern to be applied to the electron source elements, respectively.
Figure 6B:
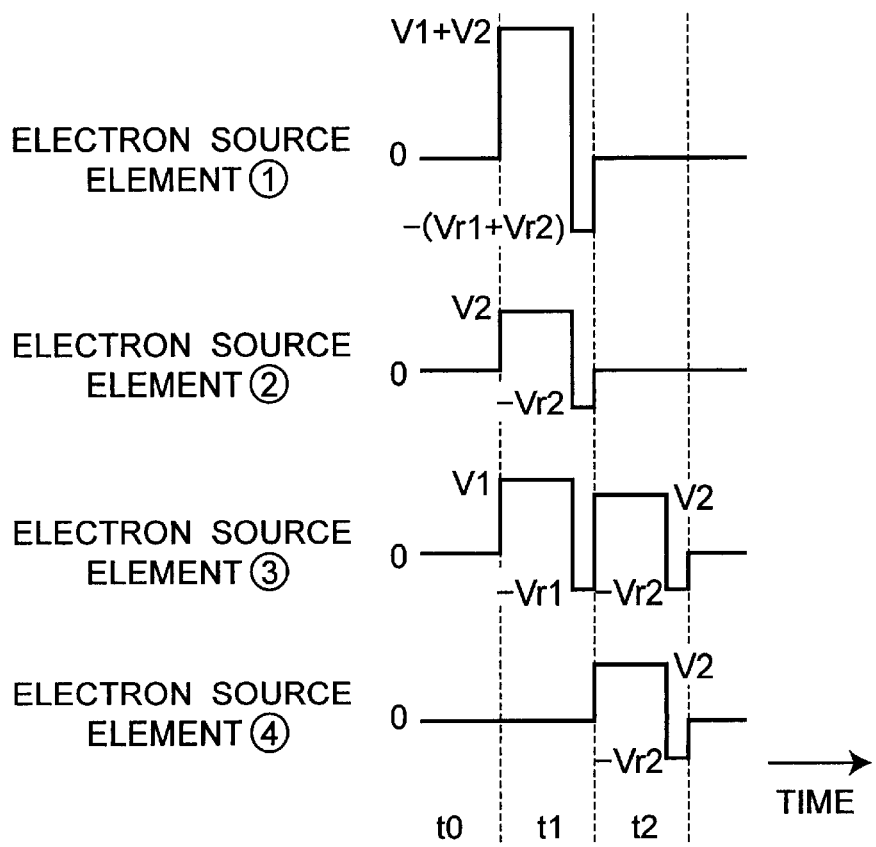

As can be apparently seen from FIG. 6A, just after data signals of positive or negative voltages have been applied, a reverse polarity voltage corresponding to each of the data signals is applied to each of the lines D1, D2, S1 and S2. When no data signal is applied or the line has the reference voltage V0 (0V), the reference voltage is maintained. Specifically, during the time-period between the time t0 and the time t1, a reverse polarity voltage having a voltage −Vr1 is applied to the column selection line D1 just after a data signal having a voltage V1 has been applied, and a reverse polarity voltage having a voltage Vr2 is applied to the row selection line S1 just after a line signal having the voltage −V2 has been applied. During this time-period, the lines D2, S2 are applied with no data signal and thereby kept in the reference voltage V0 (0V).

Thus, as can be apparently seen from FIG. 6B, a forward-bias voltage (V1+V2) is applied to the electron source element ① connected with the selected lines D1, S1 (when the electron source element ① is biased). A forward-bias voltage V2 is applied to the electron source element ② connected with the non-selected column selection line D2 and the selected row selection line S1. A forward-bias voltage V1 is applied to the electron source element ③ connected with the selected column selection line D1 and the non-selected row selection line S2. The reference voltage (0V) is applied to the electron source element ④ connected with the non-selected lines D2, S2.

Just after the above forward-bias voltages [(V1+V2), V2, V1, 0V] have been applied, the electron source elements ① to ④ are applied with the reverse-bias voltages [−(Vr1+Vr2), −Vr2, −Vr1, 0V] corresponding to the forward-bias voltages, respectively. That is, when a larger forward-bias voltage (positive voltage) is applied to bias an electron source element, a larger reverse-bias voltage (negative voltage) will be subsequently applied thereto. When a small forward-bias voltage is applied to an electron source element but not effective to bias the electron source element, a small reverse-bias voltage will be subsequently applied thereto. When no forward-bias voltage is applied, a reverse-bias voltage to be subsequently applied will be 0V. In each of the electron source elements, the time-period of applying the forward-bias and reverse-bias voltages is set at a approximately (or nealy) constant value.

Preferably, the absolute value of each of the reverse-bias voltages (negative voltages) is set equal to or less than that of the corresponding forward-bias voltage (positive voltage). This is intended to prevent dielectric breakdown caused by applying excessively large reverse-bias voltage and damage due to Joule heat arising from excessively heavy current. Preferably, the absolute value of each of the reverse-bias voltages (negative voltages) is set in the range of 50 to 100% with respect to that of the corresponding forward-bias voltage (positive voltage) to obtain a sufficient effect of the reverse-bias voltages while preventing damages of the electron source elements.

Advantages of controlling the time-period of applying the forward-bias and reverse-bias voltages will be described below. It is known that when the electron transit layer is made, for example, of porous polycrystalline silicon, electrons are accelerated while sequentially tunneling oxide films on the peripheries of nanocrystalline silicons and then emitted into a vacuum space. It is also known that carriers are transmitted in porous polycrystalline silicon according to a mechanism referred to as an anomalous dispersion represented by a diffusion index function. More specifically, when a forward-bias voltage is applied to an electron source using a porous material and electrons are trapped in an oxide film, the electrons would be anomalously dispersed. If the time-period of applying the forward-bias and reverse-bias voltages is not constant, the state of the trapped electrons is varied and thereby an optimum reverse-bias voltage is changed with time. Thus, it is required to control the time-period of applying the forward-bias and reverse-bias voltages in order to suppress the fluctuation of electron emission characteristics. In an electron source having a single insulating layer disclosed, for example, in the Japanese Patent Laid-Open Publication No. 11-95716, because such an anomalous dispersion does not occur so that the carriers are swept out of the trap relatively fast, the variation in the timing of applying the voltages would have a few influence.

A technique for changing the amount of electrons to be emitted from an electron source element includes (A) a method of controlling the level of voltage to be applied to the electron source element, (B) a method of controlling the time-period of applying a voltage while maintaining the level of the voltage constant, and (C) a method of applying a short-time pulsed constant voltage and controlling the number of pulses. In the method (A), the absolute value of a reverse-bias voltage is preferably controlled in the range of about 50 to 100% with respect to that of a forward-bias voltage. In the method (B), the time-period of applying a reverse-bias voltage is preferably controlled in response to the time-period of applying a forward-bias voltage. In the method (C), a pulsed reverse-bias voltage is preferably applied while controlling the number of pulses. In either method, it is understood that the effect of the present invention can be obtained even if only a single pulse of the reverse-bias voltages is simply applied.

Figure 7A:
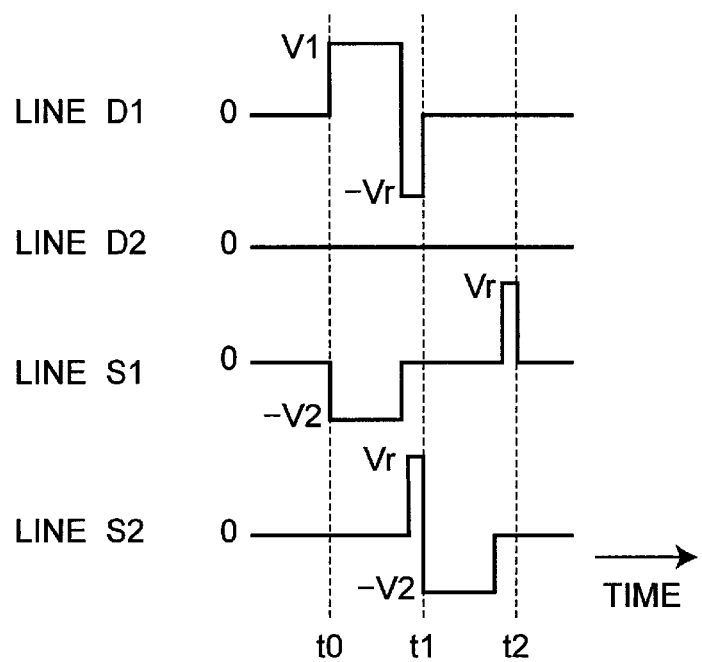
FIGS. 7A to 7B are diagrams showing another voltage pattern to be applied to the row and column selection lines and another voltage pattern to be applied to the electron source elements, respectively.
Figure 7B:
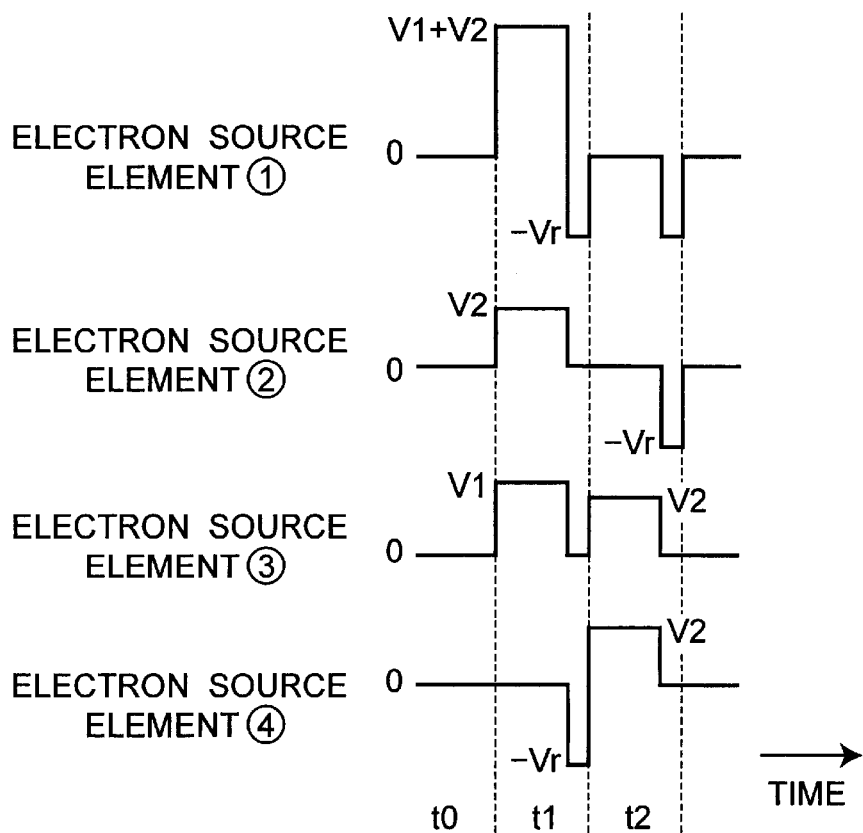

Further, as shown in FIGS. 7A and 7B, a reverse-bias voltage is applied to the selected column selection line, while a bias voltage having a reverse polarity with respect to the reverse-bias voltage may be applied to the non-selected row selection line. In this case, the reverse-bias voltage is applied to at least the electron source element which has been biased. This makes it possible to suppress the relaxation of the electric field due to the captured electrons in the traps and to provide extended lifetime of the electron source 10.

Some modifications of the method of biasing the electron source 10 according to the first embodiment will be described below.

As described above, the reverse-bias voltage value V2 (absolute value) is preferably set in the range of 50 to 100%, for example, at 60%, with respect to that of the forward-bias voltage value V1 (absolute value). Given that the reverse-bias voltage value V2 is set at 60% with respect to that of the forward-bias voltage value V1, when the reverse-bias voltage value V1 is 12V or 16V, the forward-bias voltage value V1 will be about 7V or about 10V, respectively.

Figure 8A:
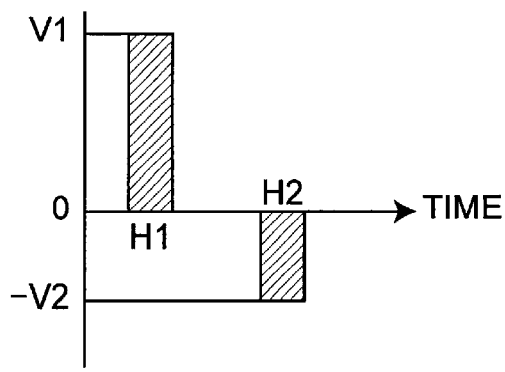
FIGS. 8A to 8B are waveform charts of output voltages of the bias power supply.

For example, as shown in FIG. 8A, the pulse width H1 of the forward-bias voltage value V1 and the pulse width H2 of the reverse-bias voltage value V2 are set at the same value in the range of 100 to 1 ms. Alternatively, the pulse width H2 of the reverse-bias voltage value V2 may be set about 0.5 to 2 times greater than the pulse width H1 of the forward-bias voltage value V1. For example, when the pulse width H1 is 10 ms, the pulse width H2 may be set in the range of 5 to 20 ms.

Figure 8B:
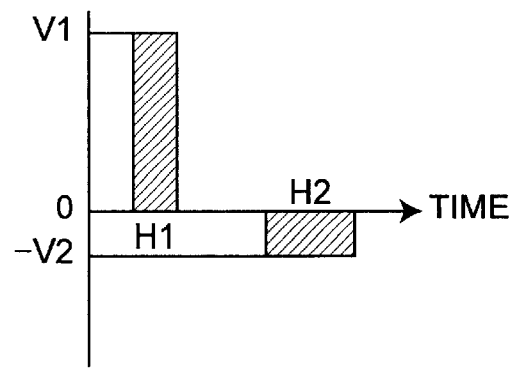

Further, an integrated value of the time-periods of applying the reverse-bias voltage value V2 may be set in the range of 50 to 100%, for example, at 50%, with respect to that of the time-periods of applying the forward-bias voltage value V1. In this case, as shown in FIG. 8B, the reverse-bias voltage value V2 may be set at 25% with respect to the forward-bias voltage value V1, and the pulse width H2 of the reverse-bias voltage value V2 may be set 2 times greater than the pulse width H1 of the forward-bias voltage value V1.

Figure 9:
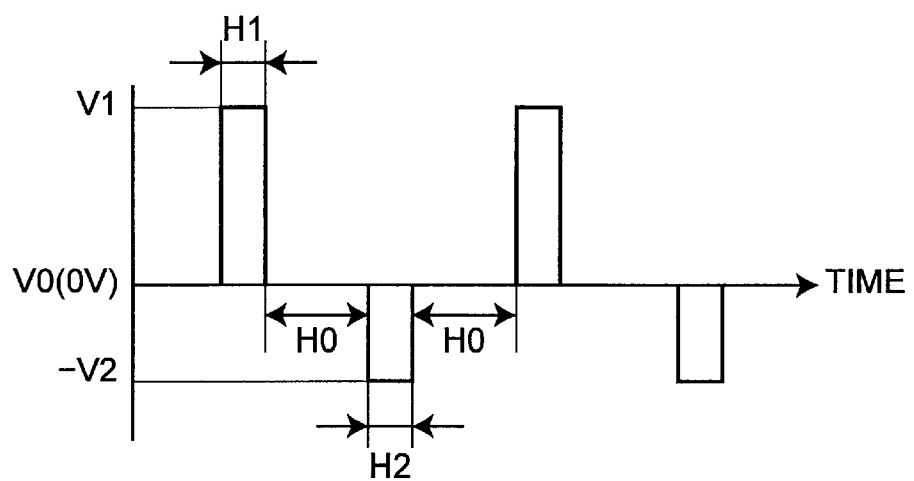
FIG. 9 is a waveform chart of an output voltage of the bias power supply.

Further, as shown in FIG. 9, an off voltage time-period H0 having an applied voltage V0 (zero V) may be inserted between the time-period of applying the forward-bias voltage and the time-period of applying the reverse-bias voltage, and the respective voltages may be applied according to a repeating pattern of V1→V0→V2→V0→V1 - - - . In this case, the off voltage time-period H0 is preferably set greater than each of the pulse width H1 and the pulse width H2. For example, when each of the pulse width H1 and the pulse width H2 is 10 ms, the off voltage time-period H0 may be set at 40 ms. Thus, a duty ratio or H1/(H1+H2+2H0) becomes 1/10.

Figure 10A:
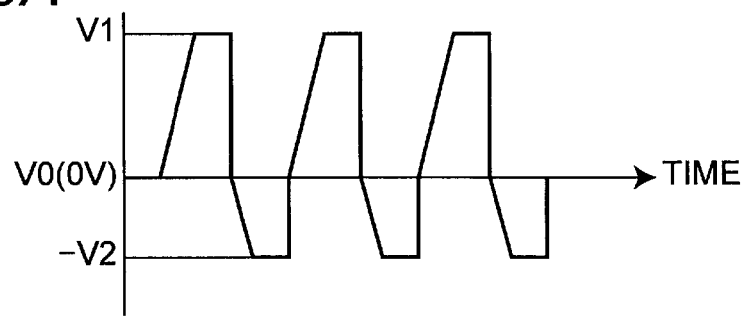
FIGS. 10A to 10D are waveform charts of output voltages of the bias power supply.
Figure 10B:
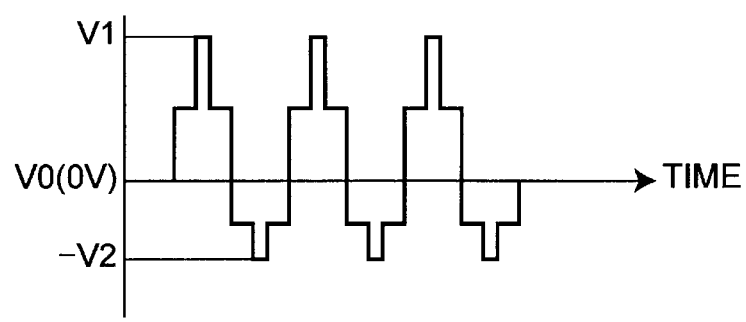
Figure 10C:
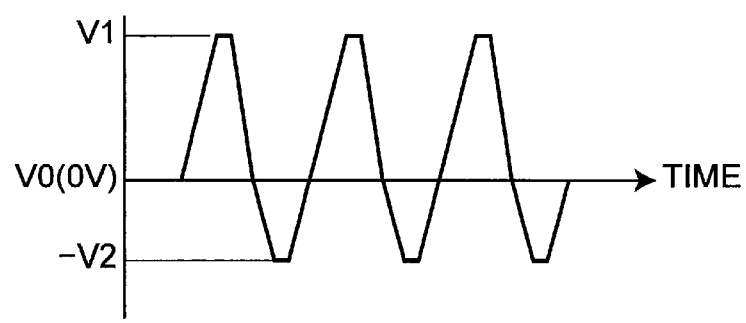
Figure 10D:
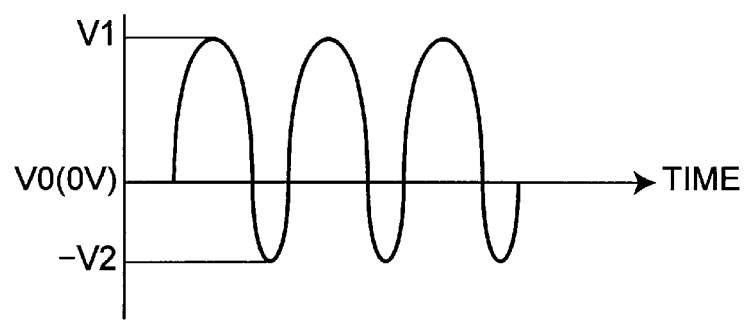

In order to suppress a sharp change of the electric field acting to the silicon oxide film in the drift layer (electron transit layer) 6, the respective pulse waveforms of the forward-bias voltage V1 and the reverse-bias voltage −V2 may include a leading edge having a slanted shape as shown in FIG. 10A. Alternatively, the respective pulse waveforms of the forward-bias voltage V1 and the reverse-bias voltage −V2 may be a stepped pulse, triangular pulse or sine pulse as shown in FIGS. 10B to 10D. In such cases, a sharp change of the electric field acting to the electron source element 10a can be suppressed to reduce damage of the drift layer 6. In addtion, the generation of Joule heat can be suppressed by providing the off voltage time-period for allowing the applied voltage to be zero V. This provides more enhanced reliability of the electron source.

Figure 11:
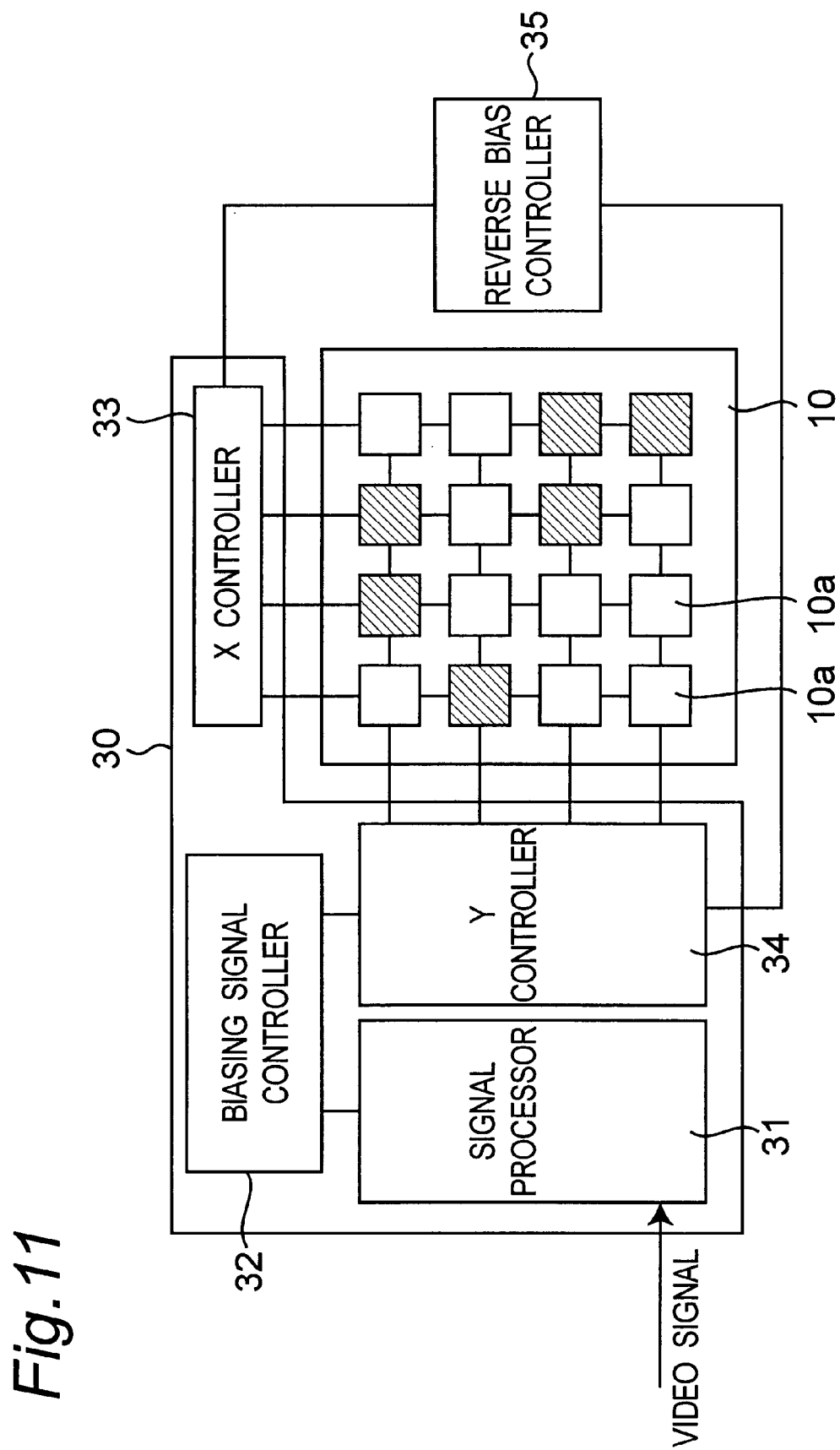
FIG. 11 is a schematic diagram of an image display device including a plurality of electron source elements.

When the electron source 10 according to the first embodiment is used in a multicolor image display device, the electron source 10 is biased by a bias circuit 30 according to a video signal entered from outside, as shown in FIG. 11. The bias circuit 30 includes a signal processor 31, a biasing signal controller 32, an X controller 33, and a Y controller 34. The X controller 33 is operable to control a voltage or potential of each of the surface electrodes 7 or an X electrode set composed of the plurality of surface electrodes 7. The Y controller 34 is operable to control a voltage or potential of each of the lower electrodes 12a or a Y electrode set composed of the plurality of lower electrodes 12a. The signal processor 31 is operable to convert the entered video signal into a signal for biasing the matrix-structured electron source 10. The biasing signal controller 32 is operable to give instructions to the X controller 33 and the Y controller 34 according to the signal converted by the signal processor 31. The electron source element 10a is formed in each of individual sub-pixels each composed of a R, G or B fluorescent body of a glass face plate 40 (see FIG. 12) to be disposed opposed to the electron source 10. The sub-pixels are provided on the surface of the face plate 40 opposed to the electron source 10.

The bias circuit 30 of the electron source 10 including the electron source elements 10a having a 4×4 matrix arrangement as shown in FIG. 11 is provided with a reverse bias voltage controller 35 (feedback circuit) outside the electron source elements. The reverse bias voltage controller 35 is operable to detect a reverse-bias current (diode current) flowing through each of the electron source elements 10a when a reverse-bias voltage is applied thereto to appropriately change the reverse-bias voltage such that the reverse-bias current is maintained at a constant value. Specifically, the reverse-bias voltage is reduced as the reverse-bias current is increased, and the reverse-bias voltage is increased as the reverse-bias current is reduced. An initial value of the reverse-bias current at the initiation of the bias is used as a reference value thereof.

According to this feedback control, the amount of captured electrons in the drift layer 6 can be calculated to apply the reverse-bias voltage with a minimum energy capable emitting the captured electrons. This can provide reduced power consumption, and prevent damages of the electron source elements due to excessive voltage to achieve enhanced reliability of the electron source.

On the other hand, the bias power supply Va may be configured to control at least one of the level of a voltage to be applied between the surface electrode 7 and the lower electrode 12 and the time-period of applying the voltage, so that the energy from Joule heat generated in the drift layer 6 when the electron source elements 10a are biased to emit electrons therefrom falls within an adequate thermal energy capable of allowing electrons captured by the traps 9 to be released out of the drift layer 6. Thus, the thermal energy can be applied to the drift layer 6 to release the captured electrons in the traps 9 out of the drift layer 6. In this case, the thermal energy can be readily controlled. Alternatively, a thermal energy capable of allowing electrons captured by the traps 9 to be released out of the drift layer 6 may be applied from outside to release the captured electrons in the traps 9 out of the drift layer 6. Thus, the captured electrons in the traps 9 can be released out of the drift layer 6 without modification of conditions for emitting electrons from the electron source elements.

In the first embodiment, the drift layer 6 composed of the oxidized porous polycrystalline silicon layer serves as an electron transit layer. Alternatively, the electron transit layer may be composed of an insulative layer made of $Al_2O_3$, $SiO_2$ or the like. In this case, the electron source 10 can operate as with an electron source having the MIM structure. Electron emission characteristics can also be improved by appropriately setting the thickness of the electron transit layer.

(Second Embodiment)

A second embodiment of the present invention will be described below. The structure of an electron source 10 according to the second embodiment will first be described with reference to FIGS. 12 to 14, and subsequently a method of biasing the electron source 10 will be described.

Figure 12:
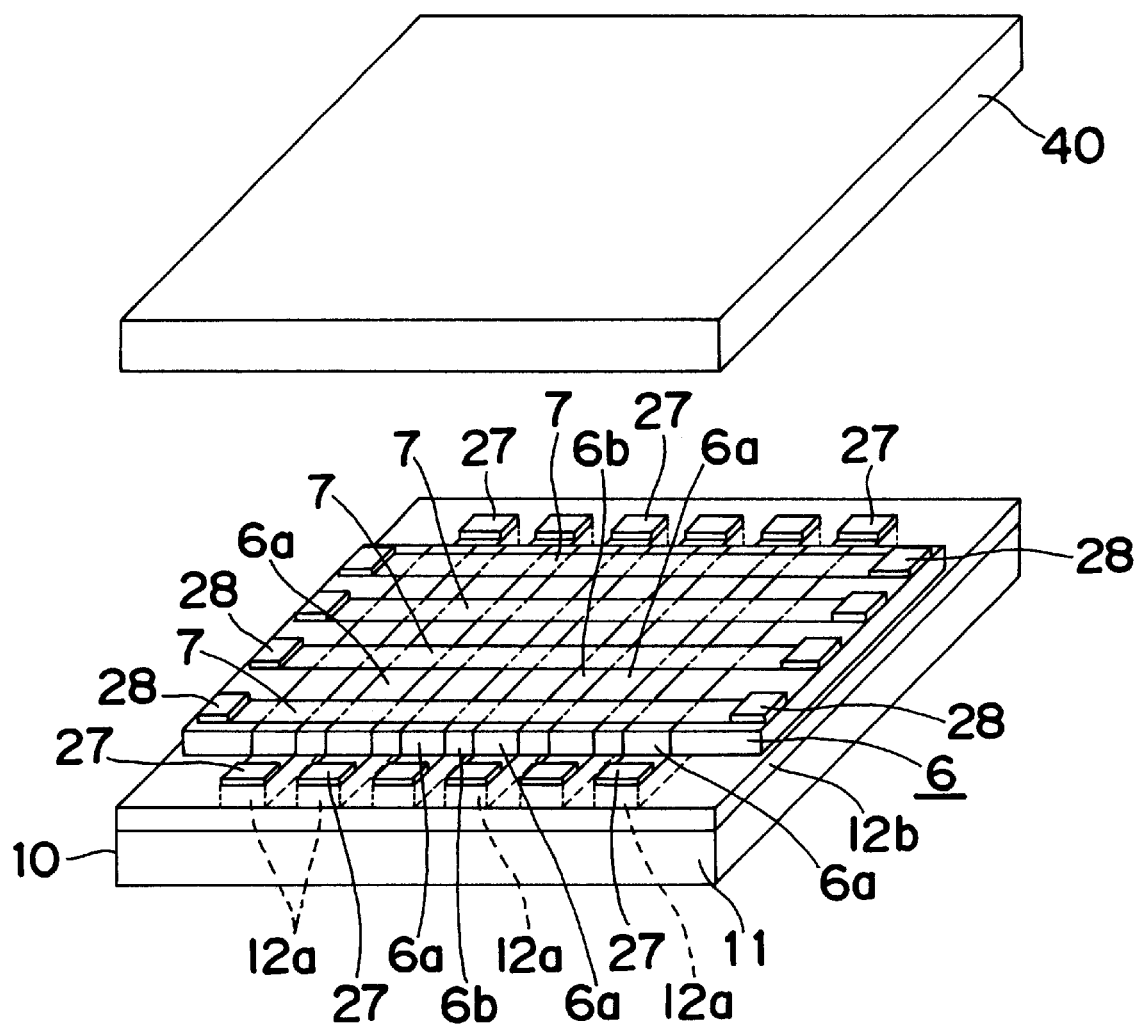
FIG. 12 is a perspective view of an electron source according to a second embodiment of the present invention.

As shown in FIG. 12, the electron source 10 includes an insulative substrate 11 composed of a glass substrate, and a plurality of lower electrodes 12a made of a conductive material (e.g. n-type polycrystalline silicon), a plurality of insulating portions 12b made of non-doped polycrystalline silicon, a plurality of drift layers 6, and a plurality of surface electrodes 7. The lower electrodes 12a are formed in parallel with each other on the front surface of the insulative substrate 11. The insulating portions 12b fill in the respective spaces between the lower electrodes. Each of the drift layers 6 includes a drift portion 6a and a separating portion 6b. The drift layers 6 are superimposed on the lower electrodes 12a and composed of oxidized porous polycrystalline silicon layers or an oxidized porous polycrystalline semiconductor layers. The separating portions 6b are composed of polycrystalline silicon layers filling in the respective spaces between the drift portions 6a. The surface electrodes 7 are formed on the drift layer 6 to extend in a crosswise direction of the lower electrodes 12a. Each of the lower electrodes 12a has a strip shape and both longitudinal ends each formed with a pad 27 thereon. Each of the surface electrodes 7 has a strip shape and both longitudinal ends each formed with a pad 28 thereon.

In this electron source 10, the drift portions 6a of the drift layers 6 are sandwiched between the plurality of lower electrodes 12a and the plurality of surface electrodes 7. Thus, by selectively pairing one of the surface electrodes 7 and one of the lower electrodes 12a and applying a voltage between the selected electrodes, a strong electric field is provided only to a region corresponding to the intersection between the selected surface electrode 7 and lower electrode 12a to emit electrons from the region. That is, the electron source 10 is equivalent to an electron source in which an electron source element 10a having the surface electrode 7, the lower electrode 12a and the drift portion 6a is provided to each lattice point of a matrix composed of the surface electrodes 7 and the lower electrodes 12a. Thus, electrons can be emitted from desired one of the electron source elements 10a by selecting the pair of the surface electrode 7 and the lower electrode 12a to be applied with a voltage. In the second embodiment, the drift portion 6a has the same structure as that of the drift layer 6 (see FIG. 2) in the first embodiment.

As with the first embodiment, the drift portion 6a in the second embodiment may be composed of a nitrided porous polycrystalline silicon layer or an oxynitrided porous polycrystalline silicon layer. Further, the drift portion 6a may be composed of any other suitable oxidized, nitrided or oxynitrided porous semiconductor layer.

Figure 13:
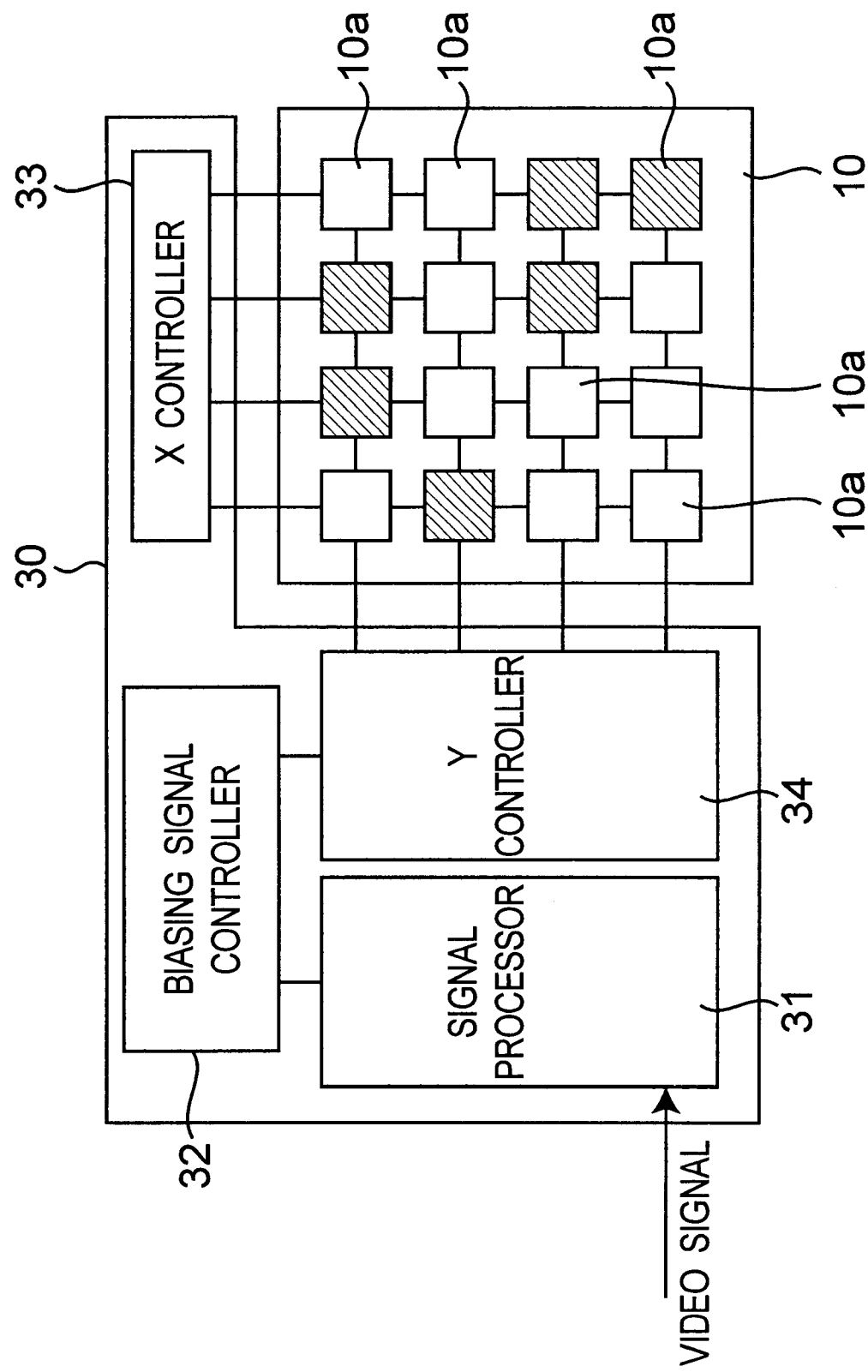
FIG. 13 is a schematic diagram of another image display device including a plurality of electron source elements.
Figure 14:
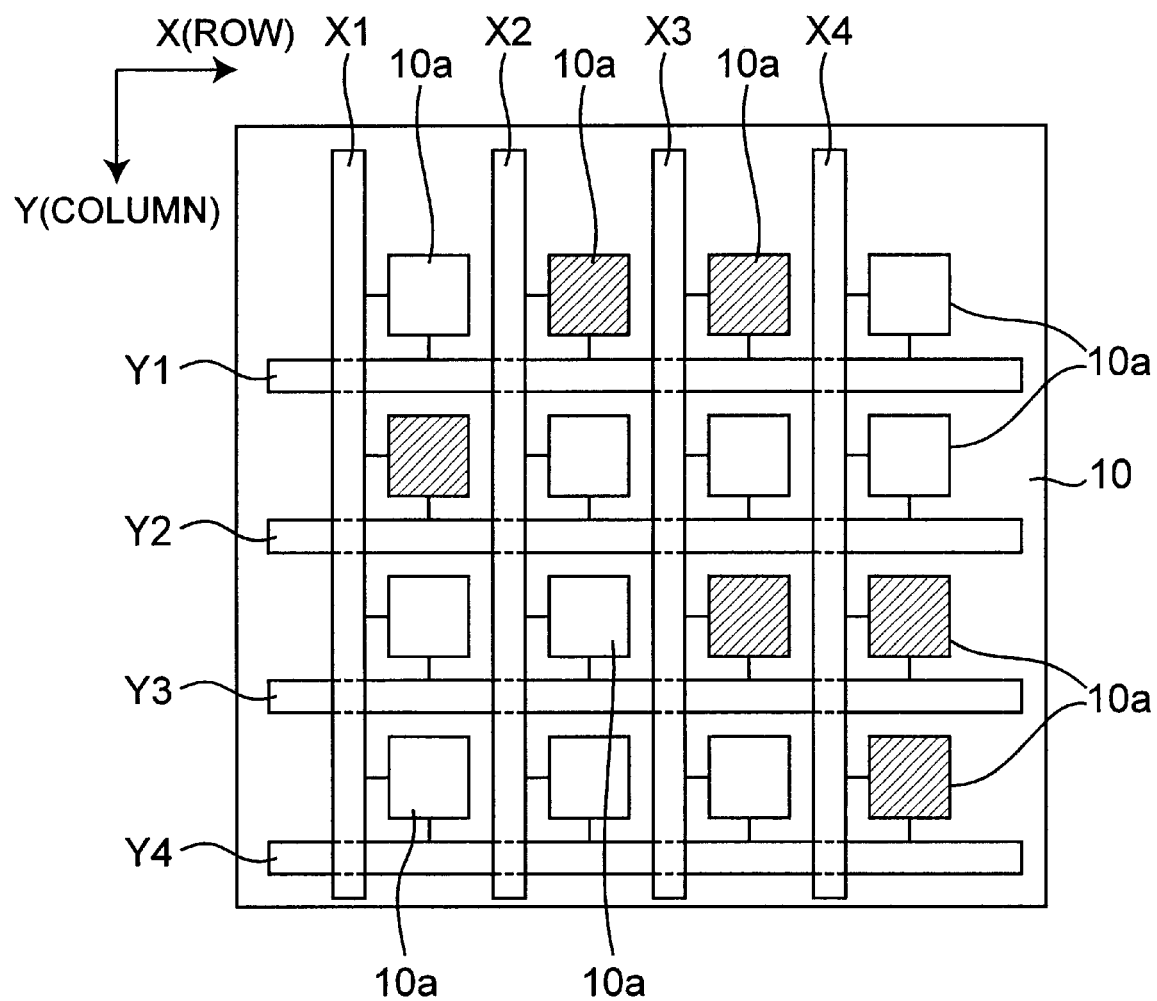
FIG. 14 is a partially enlarged schematic view of the image display device in FIG. 13.
Figure 15:
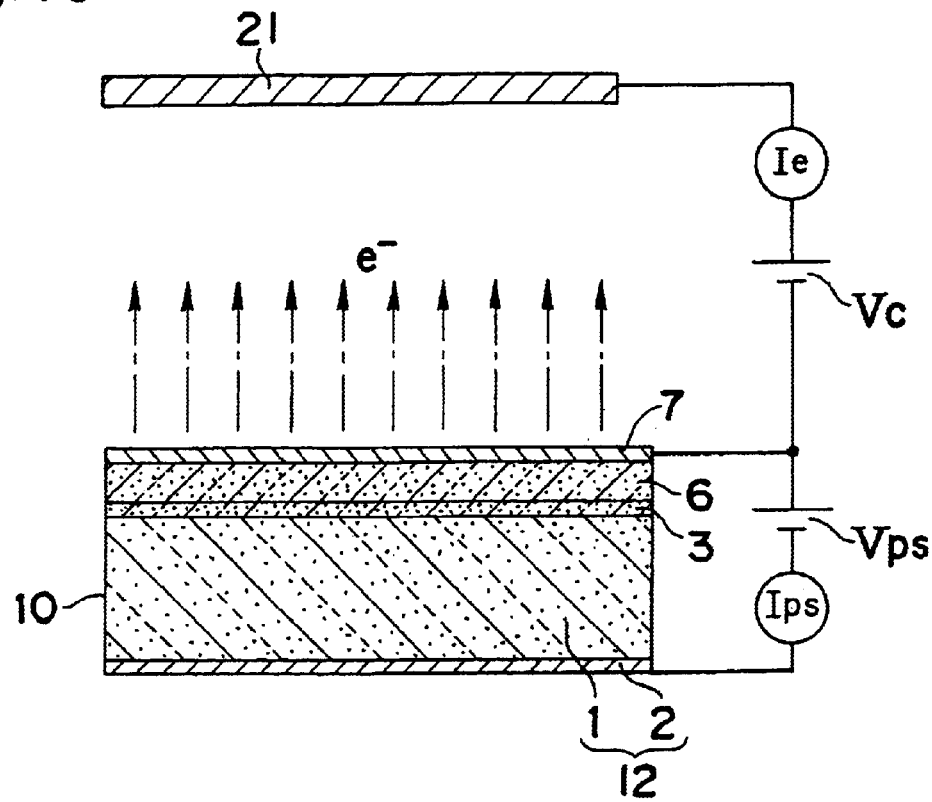
FIG. 15 is an elevational sectional view of a conventional electron source.

As shown in FIG. 13, the electron source 10 (matrix-arrangement electron source) according to the second embodiment is usable in a multicolor image display device, and is biased by a bias circuit 30 according to a video signal entered from outside. As with the first embodiment (see FIG. 11), the bias circuit 30 includes a signal processor 31, a biasing signal controller 32, an X controller 33, and a Y controller 34. However, the bias circuit 30 does not include the reverse bias voltage controller. The electron source element 10a is formed in each of individual sub-pixels each composed of a R, G or B fluorescent body of a glass face plate 40 (see FIG. 12) to be disposed opposed to the electron source 10. The sub-pixels are provided on the surface of the face plate 40 opposed to the electron source 10.

By way of simplifying explanation, given that the electron source 10 includes four surface electrodes 7 and four lower electrodes 12a which also serve as column selection electrodes X1, X2, X3, X4 and row selection electrodes Y1, Y2, Y3, Y4, respectively. In this case, in order to provide reduced power consumption, the bias circuit 30 of the electron source 10 controls to set the respective potentials of the selected column selection electrodes X1–X4 at a first given potential and electrically float the non-selected column selection electrodes X1–X4. Further, the bias circuit 30 controls to set the respective potentials of the selected row selection electrodes Y1–Y4 at a second given potential less than the first given potential and electrically float the non-selected row selection electrodes Y1–Y4. Given that the first given potential is VXH' and the second given potential is VYL', the following inequality is satisfied; VXH'>VYL'>0. The column selection electrodes X1–X4 and/or the row selection electrodes Y1–Y4 may be composed of bus electrodes.

The method of biasing the electron source 10 will be described below. The bias circuit 30 for biasing the electron source 10 applies a forward-bias voltage between the surface electrode 7 and the lower electrode 12 of the selected electron source element 10a as with the first embodiment. Then, the bias circuit 30 applies a reverse-bias voltage between the surface electrode 7 and the lower electrode 12 of the non-selected electron source element 10a as with the first embodiment. Thus, in the biasing method according to the second embodiment, the electrons captured by the traps 9 (see FIG. 2) during the selected state of the electron source element 10a can be released out of the drift layer 6 during the non-selected state of this electron source element 10a. Thus, the need for modifying bias conditions of the electron source elements 10a is eliminated.

In the second embodiment, the bias circuit 30 is made up of electron releasing means for allowing the electrons captured by the traps 9 in the drift portion 6a serving as an electron transit layer to be released out of the drift portion 6a (drift layer 6). In the biasing method according to the second embodiment, the electrons captured by the traps 9 in the drift layer 6 when the forward-bias voltage is applied between the surface electrode 7 and the lower electrode 12 is released out of the drift layer 6 according to the energy from the bias circuit 30. Since the captured electrons in the traps 9 can be released out of the drift layer 6 in this way, the relaxation of the electric field due to the captured electrons in the traps 9 can be suppressed to provide extended lifetime of the electron source 10.

In the second embodiment, the bias circuit 30 is made up of the electron releasing means. Alternatively, another electron releasing means for radiating onto the electron source elements 10a a light of a certain wavelength having an energy capable of allowing electrons captured by the traps 9 to be released therefrom may be used. In this case, the captured electrons in the traps 9 can be released out of the drift layer 6 by radiating the light of the above wavelength onto the electron source elements 10a. If a light source for radiating the light of the above wavelength is additionally provided as such electron releasing means, the light source can be simply replaced to cope with various traps having different energy levels. Further, a fluorescent body capable of being excited by the electrons emitted from the electron source elements 10a to generate a light of the above wavelength (or radiating the light of the above wavelength onto the electron source element 10a) may be provided on the surface of the face plate 40 opposed to the electron sources 10, as still another electron releasing means. In this case, the need for providing an additional power supply for exciting the light of the above wavelength is eliminated. This facilitates extending lifetime of the electron sources 10 and provides reduced power consumption.

Such light radiation excites the captured electrons in the traps, and thereby the captured electrons are readily released from the traps. Thus, the reverse-bias voltage can be applied with lower energy to lower the level of the voltage or reduce the time-period of applying the voltage. This can provide reduced power consumption and prevent damages of the electron source elements. Further, when the electron source is applied to a luminescent device such as displays, lifetime of the electron source will be extended by operating the device to control the wavelength of light from a fluorescent body. In case of the fluorescent body capable of emitting three colors of R, G and B, the emission wavelength is varied depending on the location of the fluorescent body. In this case, emissions of ultraviolet and near-ultraviolet ranges can be mixed to provide extended lifetime of the electron source without adverse affect on visible light.

While the present invention has been described by reference to specific embodiments, various modifications and alterations will become apparent to those skilled in the art. Therefore, it is intended that the present invention is not limited to the illustrative embodiments herein, but only by the appended claims and their equivalents.

What is claimed is:

1. A method of biasing a field emission-type electron source comprising an electron source element which includes a lower electrode, a surface electrode, and a strong-field drift layer interposed between said lower and surface electrodes to allow electrons to pass therethrough according to an electric field induced by applying a forward voltage between said lower and surface electrodes such that said surface electrode has a higher potential than that of said lower electrode, in which the electrons passing through said strong-field drift layer are emitted through said surface electrode, wherein when the forward voltage is applied to said electron source element, a reverse voltage is applied to said electron source element after applying the forward voltage, while when the forward voltage is not applied to said electron source element, no reverse voltage is applied to said electron source element.

2. The method according to claim 1, wherein an interval for applying the forward and reverse voltages to said electron source element is set within a given time.

3. The method according to claim 1, wherein when a data signal is applied to said electron source element, the reverse voltage is applied to said electron source element after applying the data signal, while when a line signal is applied to said electron source element also, the reverse voltage is applied to said electron source element after applying the line signal.

4. The method according to claim 1, wherein the absolute value of the reverse voltage is set equal to or less than that of the forward voltage.

5. The method according to claim 4, wherein the absolute value of the reverse voltage is set in the range of 50 to 100% with respect to that of the forward voltage.

6. The method according to claim 1, wherein the reverse voltage is controlled in response to a pulse width of the forward voltage.

7. The method according to claim 4, wherein an integrated value along time of the absolute value of the reverse voltage is set in the range of 50 to 100% with respect to that of the absolute value of the forward voltage.

8. The method according to claim 1, wherein each of the forward and reverse voltages is a pulse voltage having a waveform which includes a leading edge formed of a slanted or stepped shape.

9. The method according to claim 1, wherein an off voltage time-period for allowing the applied voltage to be zero V is provided between the time-period of applying the forward voltage and the time-period of applying the reverse voltage.

10. The method according to claim 9, wherein the forward and reverse voltages are repeatedly applied with inserting the off voltage time-period therebetween.

11. The method according to claim 1, wherein a forward current flowing through said electron source element is detected when the forward voltage is applied to said electron source element, while the reverse voltage is feedback-controlled according to the forward current.

12. The method according to claim 1, wherein a reverse current flowing through said electron source element is detected when the reverse voltage is applied to said electron source element, while the reverse voltage is feedback-controlled according to the reverse current.

13. The method according to claim 1, wherein an emission current emitted into a vacuum space is detected when the forward voltage is applied to said electron source element, while the reverse voltage is feedback-controlled according to the emission current.

14. The method according to claim 1, wherein said electron source element is irradiated with a light of a certain wavelength having an energy capable of allowing electrons captured by a trap in said strong-field drift layer to be released therefrom, so as to release the captured electrons in said trap out of said strong-field drift layer.

15. The method according to claim 1, wherein said electron source element is irradiated with a light excited by electrons emitted from said electron source element, of a certain wavelength having an energy capable of allowing electrons captured by a trap in said strong-field drift layer to be released therefrom, so as to release the captured electrons in said trap out of said strong-field drift layer.

16. The method according to claim 14, wherein a fluorescent body capable of generating the light of said wavelength is used.

17. The method according to claim 15, wherein a fluorescent body capable of generating the light of said wavelength is used.

18. The method according to claim 14, wherein a light source capable of radiating the light of said wavelength is used.

19. The method according to claim 15, wherein a light source capable of radiating the light of said wavelength is used.

20. The method according to claim 1, wherein said strong-field drift layer includes a number of nano-order semiconductor nanocrystals, and insulating films each of which is formed on a surface of each of said semiconductor nanocrystals, said insulating film having a film thickness less than a grain size of each of said semiconductor nanocrystals.

21. A method of biasing a field emission-type electron source comprising electron source elements each of which includes a lower electrode, a surface electrode, and a strong-field drift layer interposed between said lower and surface electrodes to allow electrons to pass therethrough according to an electric field induced by applying a forward voltage between said lower and surface electrodes such that said surface electrode has a higher potential than that of said lower electrode, in which the electrons passed through said strong-field drift layer are emitted through said surface electrode, wherein said strong-field drift layer includes a number of nano-order semiconductor nanocrystals, and insulating films each of which is formed on a surface of each of said semiconductor nanocrystals, said insulating film having a film thickness less than a grain size of each of said semiconductor nanocrystals, and a reverse voltage is applied in block to all of said electron source elements in every frame period.

22. A field emission-type electron source comprising:

an electron source element including a lower electrode, a surface electrode, and a strong-field drift layer interposed between said lower and surface electrodes to allow electrons to pass therethrough according to an electric field induced by applying a forward voltage between said lower and surface electrodes such that said surface electrode has a higher potential than that of said lower electrode; and a bias circuit including a forward voltage applying circuit and a reverse voltage applying circuit, wherein when said forward voltage applying circuit has applied the forward voltage to said electron source element, said reverse voltage applying circuit applies a reverse voltage to said electron source element, while when said forward voltage applying circuit has not applied the forward voltage to said electron source element, said reverse voltage applying circuit does not apply the reverse voltage to said electron source element.

* * * * *